United States Patent [19]

Vardi et al.

[11] E Patent Number: Re. 32,083

[45] Reissued Date of Patent: Feb. 18, 1986

[54] REDUCTION OF SUPERHEATING

[75] Inventors: Isaih Vardi, Rehovoth; Joseph Bourne, Raanana; Jonathan Ben-Dror, Hadar Am; Yigal Kimchi, Ramat Gan, all of Israel

[73] Assignee: Eshel Residual Energy for Cooling and Heating Ltd., Azor, Israel

[21] Appl. No.: 632,887

[22] Filed: Jul. 20, 1984

Related U.S. Patent Documents

Reissue of:

[64] Patent No.: 4,383,424
Issued: May 17, 1983
Appl. No.: 246,844
Filed: Mar. 23, 1981

[30] Foreign Application Priority Data

Mar. 25, 1980 [IL] Israel ..... 59708

[51] Int. Cl.[4] ..... F25B 15/00
[52] U.S. Cl. ..... 62/476; 62/489
[58] Field of Search ..... 62/476, 489

[56] References Cited

U.S. PATENT DOCUMENTS

| | | | |
|---|---|---|---|
| 1,630,648 | 5/1927 | Wirth | 62/476 |
| 3,158,008 | 11/1964 | Aronson | 62/476 |
| 3,225,556 | 12/1965 | Rohrs | 62/476 X |
| 3,267,691 | 8/1966 | Osborn | 62/476 |

*Primary Examiner*—Lloyd L. King
*Attorney, Agent, or Firm*—Fleit, Jacobson, Cohn & Price

[57] ABSTRACT

The present invention relates to an improved absorption refrigeration device of the type using a lithium halide/-water cycle wherein baffles defining a substantial pathway are provided over which superheated concentrated lithium halide solution is passed so as to substantially reduce the degree of superheating of such solution. The invention further relates to a process for reducing substantially the superheating of concentrated lithium halide (lithium bromide and/or lithium chloride) in absorption type refrigeration systems, which comprises contacting the superheated solution with an extensive surface (baffle), thereby reducing the superheating.

8 Claims, 2 Drawing Figures

REDUCTION OF SUPERHEATING

Matter enclosed in heavy brackets [ ] appears in the original patent but forms no part of this reissue specification; matter printed in italics indicates the additions made by reissue.

FIELD OF THE INVENTION

The present invention relates to improvements in absorption refrigeration systems of the type using a lithium halide (lithium bromide and/or chloride) and water cycle or another absorbent. More particularly the present invention relates to an improvement in such systems wherein a generator is used wherein the lithium halide solution is heated to remove water in vapor form so as to obtain a more concentrated lithium halide solution or where similar liquids are used which tend to give superheated solutions.

BACKGROUND OF THE INVENTION

In absorption cooling machines of the type using a lithium halide (bromide and/or chloride) water cycle water is removed from a lithium halide solution in the generator, and to a lesser degree in the evaporator sections, and thus there is obtained a more concentrated lithium halide solution.

In machines of this type where a thin film evaporator is used, the liquid, i.e. the lithium halide solution drips off the tubular elements and is passed on from there via an exit port to another section of the cooling machine. The solution which drips off the bottom tubes of a thin film evaporator (in spray type machines), is generally superheated, and this to a degree of about 10° to 13° F. This superheating causes substantial thermodynamic losses and decreases the overall efficiency of the cooling cycle.

In cooling machines based on the same cycle, wherein a flooded generator is used, with tubes submerged in a lithium halide solution, a similar phenomenon of superheating takes place where the solution is drained from the generator section of the machine. This too causes thermodynamic losses and reduces the overall efficiency of the cooling cycle. It is an aim of the present invention to reduce heat losses due to the superheating of the lithium solution, and to reduce or eliminate such superheating.

SUMMARY OF THE INVENTION

The present invention relates to improvements in absorption refrigeration machines wherein a lithium halide, such as lithium bromide and/or lithium chloride/water cycle is used.

According to the present invention means are incorporated in such machines which are adapted to eliminate or at least substantially reduce the effect of superheating of the lithium halide solution after same is concentrated by evaporation of water vapor from dilute lithium halide solutions.

According to the invention an extended path is provided by introducing baffle means into the sections of the machine at which such concentrated lithium halide is drained and circulated to other parts of the machine.

According to a preferred embodiment of the invention splash baffles are provided at the bottom part of the generator section of a cooling machine of this type, beneath the lowest row of tubes in such generator section which baffles substantially increase the path of the concentrated lithium halide from said thin film evaporator tubes and to the exit port of said generator section from where the concentrated lithium halide is circulated to the section of the machine. Droplets have a comparatively small surface area, and thus the superheating is substantial. By providing the extended surfaces of the baffles according to the present invention, the droplets move along these, spread out and form a surface film. Evaporation from such film is much better, and thus superheating is substantially reduced.

In a similar manner, in machines where a flooded type generator is used, the lithium halide which is concentrated in this section is frequently superheated to an appreciable degree, i.e. by a number of degrees F., and according to the present invention this superheating is substantially reduced by providing a structure wherein the said superheated lithium halide solution is passed over one or more baffles, whereby the superheating is substantially reduced . The added compartment with the baffles can be of a size which extends only along a part of the length of the generator section. The dimensions of the baffles have to be such as to provide for an efficient removal of excess heat from the superheated lithium halide solution.

The extended pathway of the superheated liquid along said baffles is adequate to substantially reduce the superheating. While this reaches frequently up to about 12° or even 13° F. with thin film evaporators, and where the liquid leaves the shell of this compartment while still superheated by about 7° to 8° F., the provision of efficient baffles reduces the superheating and this is reduced to about 2° to 6° F. The baffles are of simple construction and need practically no maintenance. The saving of energy is a substantial one and exceeds by far the costs of such baffle means.

DETAILED DESCRIPTION OF THE INVENTION

The invention is illustrated by way of example with reference to the enclosed schematical drawings, which are not according to scale and in which.

Figure 1:
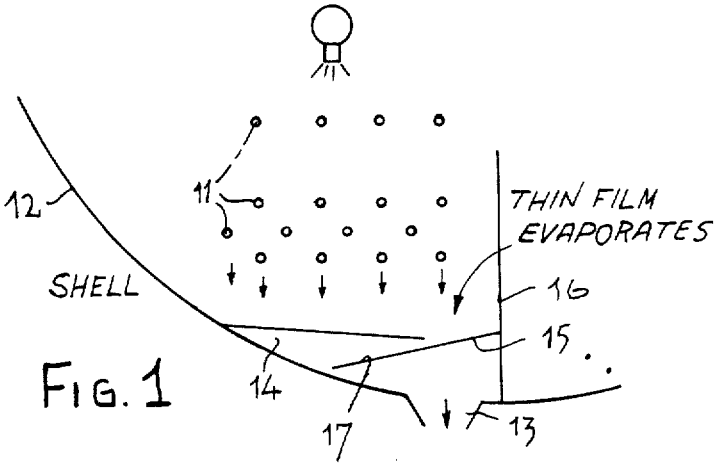
FIG. 1 is an elevational cross-sectional view through the lower part of a housing wherein there are positioned a generator and condenser section of a spray type generator operating on the principle of thin film evaporation.

As shown in FIG. 1, there is provided in the generator section a number of rows of tubes 11 disposed below the spraying device 10, and droplets of superheated liquid lithium bromide drip off the lowermost row of these. In conventional structures such droplets drop onto the bottom of the housing 12, and leave via exit port 13 as superheated liquid. As is conventional, the exit port 13 is connected to a flow line leading to the absorber of the refrigeration machine. According to the invention there are provided two inclined baffles 14 and 15, one of which is attached to the housing 12, the other to the upright structure 16, and thus droplets dripping off from the tubes 11 fall on baffle plate 14, move along it and drop onto baffle plate 15, and move along it until the liquid drips off at its edge 17. As the liquid moves along the baffle plates 14 and 15 it evaporates some water vapor and the superheating is substantially reduced.

Figure 2:
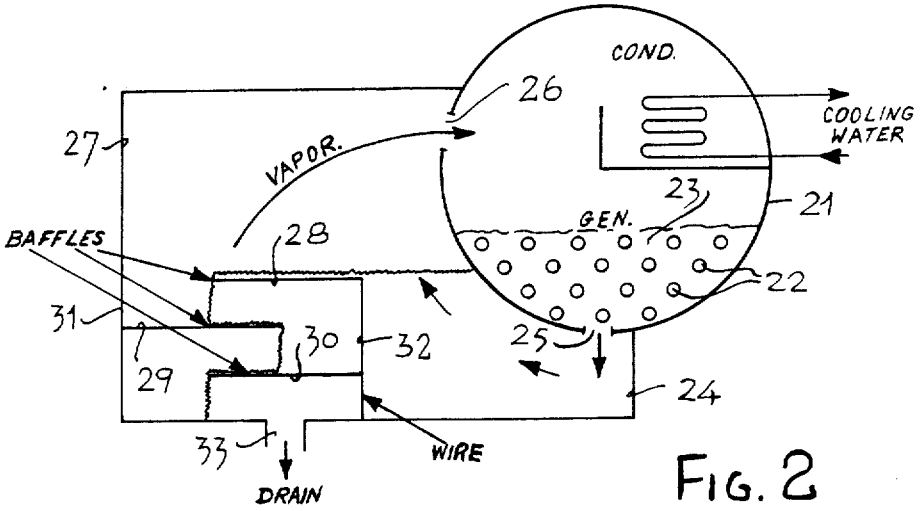
FIG. 2 is an elevational cross-sectional view through a flooded type generator with attached compartment containing a plurality of baffles for reducing superheating.

As shown in FIG. 2, a flooded type generator comprises a housing 21, wherein a plurality of tubes 22 are located in the liquid lithium bromide 23. Along a part of the length of the tubular unit 21 there is provided a housing 24. A typical length of a cooling machine of this type is about 15 feet, and in such case a housing 24 of about 18 inch will be adequate. The housing 21 is provided with an outlet port 25 and with an upper opening 26. Superheated liquid leaves via port 25, into the adjacent chamber 27 wherein a plurality of staggered baffles 28, 29 and 30 are provided, baffle 29 being attached to wall 31 and baffles 28 and 30 to wall 32. The liquid starts to boil when it enters the chamber 27, and the liquid moves along the baffles 28, 29 and 30, and thus the degree of superheating is substantially reduced, until the liquid leaves via exit opening 33. The exit opening 33, like the exit port 13 of FIG. 1, is connected to a flow line leading to an absorber of the refrigeration machine.

The provision of the extended baffles substantially increases the surface to which the superheated liquid is exposed, and the superheated liquid thus loses much of its excess of heat.

It is clear that the description is by way of illustration only and that many variations and modifications in the shape and arrangement of parts may be resorted to without departing from the scope and spirit of the invention.

We claim:

1. In an absorption refrigeration device of the type using a lithium halide/water cycle and having means defining a housing, a plurality of tubes disposed in said housing for superheating a lithium halide solution to evaporate water therefrom and form a superheated concentrated lithium halide solution, the housing having an exit port located in the lower portion of the housing for removing concentrated solution therefrom, the improvement comprising baffle means disposed between said tubes and the housing exit port for receiving the superheated concentrated lithium halide solution and flowing same over the baffle means in the form of a thin film of superheated concentrated lithium halide solution, said baffle means being comprised of a plurality of vertically stepped, horizontally extending overlapping baffles defining a tortuous pathway over which the thin film of superheated concentrated lithium halide solution flows so that further water is evaporated from the thin film as it flows over the plurality of vertically stepped, horizontally extending overlapping baffles to substantially reduce the degree of superheating of such concentrated solution and the solution flowing out of the exit port in the lower portion of the housing is of substantially reduced temperature and increased concentration.

2. A device according to claim 1 wherein the baffle means are provided beneath the lower tubes in a thin film evaporator type generator.

3. A device according to claim 1 wherein a compartment containing extended splash baffle means is provided in conjunction with a flooded type generator.

4. A device according to claim 1, wherein the baffle means comprises a plurality of inclined baffles provided between the lower tubes of a thin film evaporator of a generator and the exit port of the bottom of such generator.

5. A device according to claim 1, wherein such baffle means are provided in the evaporator section of the machine.

6. In an absorption refrigeration device of the type using a lithium halide/water cycle and having a housing with an exit opening in a lower portion thereof and a generator section disposed in the housing above the exit opening, the generator section having a plurality of rows of tubes for superheating a lithium halide solution to evaporate water therefrom, the improvement comprising baffle means having a plurality of vertically stepped horizontally extending overlapping baffles disposed in said housing between the lowermost of said rows of tubes and the housing exit opening, an uppermost one of said baffles receiving droplets of a superheated lithium halide solution falling off of the tubes and forming a surface film from the received droplets, the surface film falling from the uppermost baffle onto a lower baffle so that the surface film follows a tortuous path during travel from the uppermost baffle to the exit opening, the surface film facilitating evaporation of water from the superheated solution to thereby reduce the temperature of the superheated lithium halide solution and increase its concentration before it reaches the housing exit opening.

7. In an absorption refrigeration device of the type using a lithium halide/water cycle and having a flooded type generator with a housing and a plurality of tubes located in a liquid lithium halide solution disposed within the generator housing, the generator housing having an opening in a lower portion thereof, the improvement comprising:

a second housing extending along a portion of the length of the generator housing and positioned to receive superheated solution exiting said generator housing through said opening.

a wall extending upwardly from the bottom wall of the second housing to a level below the upper surface of the liquid lithium halide solution disposed in the generator housing, thereby forming a reservoir of solution in the second housing, a first baffle extending downwardly from the top of said wall away from said reservoir and towards a side wall of said second housing, a second baffle disposed below said first baffle and extending downwardly away from said side wall of said second housing, and an opening in the bottom of said second housing for draining solution from the second housing after passage over said first and said second baffles, said first and said second baffles providing an extended flow path for the solution thereby facilitating evaporation and cooling of the solution before it leaves the second housing.

8. The improvement of claim 7 wherein a second opening is provided between said generator housing and said second housing at a level above the upper surface of the liquid lithium halide solution disposed in the generator housing so that vapor evaporated from the solution as it passes over said first and said second baffles is fed to said generator housing.

* * * * *